(12) United States Patent
Jo et al.

(10) Patent No.: US 12,407,062 B2
(45) Date of Patent: Sep. 2, 2025

(54) BATTERY MODULE, BATTERY RACK COMPRISING SAME BATTERY MODULE, AND POWER STORAGE DEVICE COMPRISING SAME BATTERY RACK

(71) Applicant: LG ENERGY SOLUTION, LTD., Seoul (KR)

(72) Inventors: Sang-Hyun Jo, Daejeon (KR); Young-Seok Lee, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 375 days.

(21) Appl. No.: 17/610,220

(22) PCT Filed: Mar. 4, 2021

(86) PCT No.: PCT/KR2021/002709
§ 371 (c)(1),
(2) Date: Nov. 10, 2021

(87) PCT Pub. No.: WO2021/177759
PCT Pub. Date: Sep. 10, 2021

(65) Prior Publication Data
US 2022/0247032 A1    Aug. 4, 2022

(30) Foreign Application Priority Data
Mar. 4, 2020    (KR) .......... 10-2020-0027370

(51) Int. Cl.
*H01M 50/383* (2021.01)
*H01M 50/143* (2021.01)
*H01M 50/211* (2021.01)

(52) U.S. Cl.
CPC ....... *H01M 50/383* (2021.01); *H01M 50/143* (2021.01); *H01M 50/211* (2021.01)

(58) Field of Classification Search
None
See application file for complete search history.

(56) References Cited

U.S. PATENT DOCUMENTS

| 6,742,599 B1 | 6/2004 | Nam | |
|---|---|---|---|
| 2011/0000801 A1* | 1/2011 | Hirakawa | A62C 3/07 206/223 |

(Continued)

FOREIGN PATENT DOCUMENTS

| CN | 1399574 A | 2/2003 |
|---|---|---|
| CN | 107026249 A | 8/2017 |

(Continued)

OTHER PUBLICATIONS

Machine translation JP2014090782A (Year: 2023).*

(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A battery module includes at least one battery cell; and a module case configured to accommodate the at least one battery cell, wherein a fire extinguishing agent supply channel connected to a fire extinguishing tank containing a fire extinguishing agent to directly inject the fire extinguishing agent into the module case when a thermal runaway or fire occurs at the at least one battery cell is provided to an inside of at least one side of the module case.

11 Claims, 9 Drawing Sheets

(56) References Cited

U.S. PATENT DOCUMENTS

| | | |
|---|---|---|
| 2014/0170447 A1 | 6/2014 | Woehrle et al. |
| 2017/0043194 A1 | 2/2017 | Ling |
| 2018/0175466 A1 | 6/2018 | Seo et al. |
| 2018/0319234 A1 | 11/2018 | Klittich et al. |
| 2019/0351268 A1 | 11/2019 | Lee |
| 2020/0038698 A1 | 2/2020 | Ryu et al. |

FOREIGN PATENT DOCUMENTS

| | | | |
|---|---|---|---|
| CN | 108011064 A | | 5/2018 |
| CN | 109891625 A | | 6/2019 |
| EP | 2 189 187 A1 | | 5/2010 |
| EP | 2 851 973 A1 | | 3/2015 |
| JP | 5-31206 A | | 2/1993 |
| JP | 2008-251263 A | | 10/2008 |
| JP | 2011-254906 A | | 12/2011 |
| JP | 2014-90782 A | | 5/2014 |
| JP | 5953925 B2 | | 7/2016 |
| JP | 2017147128 A | * | 8/2017 |
| KR | 10-2012-0065025 A | | 6/2012 |
| KR | 10-1506575 B1 | | 3/2015 |
| KR | 10-1779187 B1 | | 9/2017 |
| KR | 10-2018-0069989 A | | 6/2018 |
| KR | 10-2018-0088189 A | | 8/2018 |
| KR | 10-2018-0106447 A | | 10/2018 |

OTHER PUBLICATIONS

Machine translation JP2017147128A (Year: 2024).*

Extended European Search Report for European Application No. 21763844.4, dated Oct. 10, 2022.

International Search Report (PCT/ISA/210) issued in PCT/KR2021/002709 mailed on Jun. 15, 2021.

* cited by examiner

BATTERY MODULE, BATTERY RACK COMPRISING SAME BATTERY MODULE, AND POWER STORAGE DEVICE COMPRISING SAME BATTERY RACK

TECHNICAL FIELD

The present disclosure relates to a battery module, a battery rack including the battery module, and an energy storage system including the battery rack.

The present application claims priority to Korean Patent Application No. 10-2020-0027370 filed on Mar. 4, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components. The battery pack is generally provided as an energy source of an electric vehicle or the like, and recently, an energy storage system including a plurality of battery racks is attracting attention as an energy source for home or industrial use.

However, the conventional battery pack or battery rack includes a plurality of battery modules, and if thermal runaway occurs in the battery cells of each battery module to cause ignition or explosion, heat or flame is transferred to neighboring battery cells, which may result in secondary explosion or the like. Thus, efforts are being made to more rapidly prevent secondary ignition or explosion.

Therefore, there is a need to find a way for providing a battery module capable of more rapidly extinguishing thermal runaway or fire at an early stage when thermal runaway occurs in the battery module or fire occurs due to the thermal runaway or the like, a battery rack including the battery module, and an energy storage system including the battery rack.

DISCLOSURE

Technical Problem

The present disclosure is designed to solve the problems of the related art, and therefore the present disclosure is directed to providing a battery module capable of more rapidly extinguishing thermal runaway or fire at an early stage when thermal runaway occurs in the battery module or fire occurs due to the thermal runaway or the like, a battery rack including the battery module, and an energy storage system including the battery rack.

Technical Solution

In one aspect of the present disclosure, there is provided a battery module, comprising: at least one battery cell, a module case configured to accommodate the at least one battery cell, and a fire extinguishing agent supply channel connected to a fire extinguishing tank containing a fire extinguishing agent to directly inject the fire extinguishing agent into the module case when a thermal runaway or fire occurs at the at least one battery cell is provided to an inside of at least one side of the module case.

The module case may include a case body configured to support the at least one battery cell; a front cover connected to the case body; a rear cover connected to the case body at a side opposite to the front cover; and a pair of side plates disposed between the front cover and the rear cover, and the fire extinguishing agent supply channel may be provided to at least one side plate of the pair of side plates.

The at least one side plate to which the fire extinguishing agent supply channel is provided may include at least one fire extinguishing agent injector configured to inject the fire extinguishing agent in the fire extinguishing agent supply channel toward the at least one battery cell when the thermal runaway or fire occurs.

The at least one fire extinguishing agent injector may include a glass bulb configured to seal the fire extinguishing agent supply channel, the glass bulb being at least partially broken to open the fire extinguishing agent supply channel when an inside of the module case is exposed to an internal gas over a predetermined temperature so that the fire extinguishing agent is guided to outside of the at least one fire extinguishing agent injector.

The at least one fire extinguishing agent injector may be provided to an inner wall of the at least one side plate to which the fire extinguishing agent supply channel facing the at least one battery cell is provided, inside the module case.

The at least one fire extinguishing agent injector may be provided at a center of an inner wall of the at least one side plate to which the fire extinguishing agent supply channel is provided, based on a longitudinal direction of the module case.

The fire extinguishing agent injector is a plurality of fire extinguishing agent injectors, and the plurality of fire extinguishing agent injectors may be arranged to be spaced apart from each other by a predetermined distance in a longitudinal direction of the module case.

The fire extinguishing agent may be water.

In addition, the present disclosure further provides a battery rack, comprising: at least one battery module according to the above embodiments; and a rack case configured to accommodate the at least one battery module.

Moreover, the present disclosure further provides an energy storage system, comprising at least one battery rack according to the above embodiments.

Advantageous Effects

According to various embodiments as above, it is possible to provide a battery module capable of more rapidly extinguishing thermal runaway or fire at an early stage when thermal runaway occurs in the battery module or fire occurs due to the thermal runaway or the like, a battery rack including the battery module, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
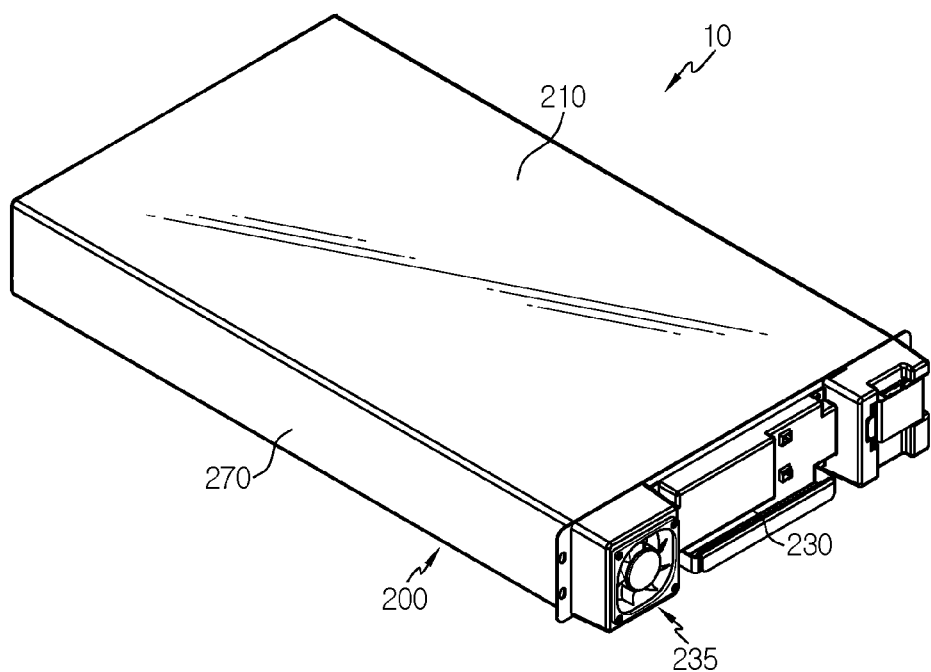
FIG. 1 is a front perspective view showing a battery module according to an embodiment of the present disclosure.
Figure 2:
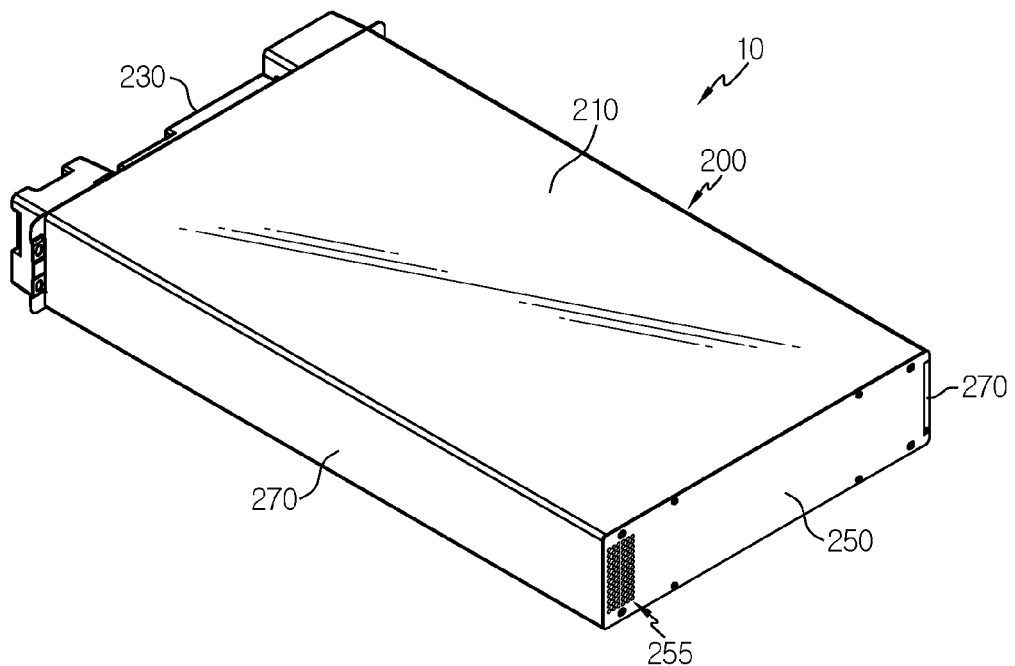
FIG. 2 is a rear perspective view showing the battery module of FIG. 1.
Figure 3:
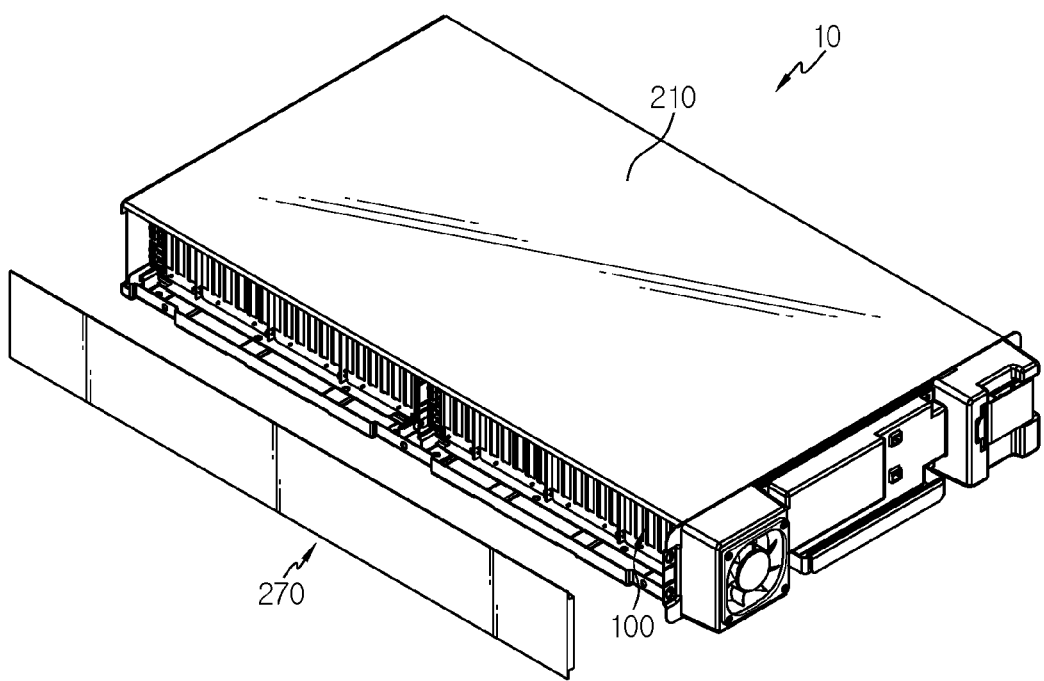
FIG. 3 is a partial exploded view showing the battery module of FIG. 1.
Figure 4:
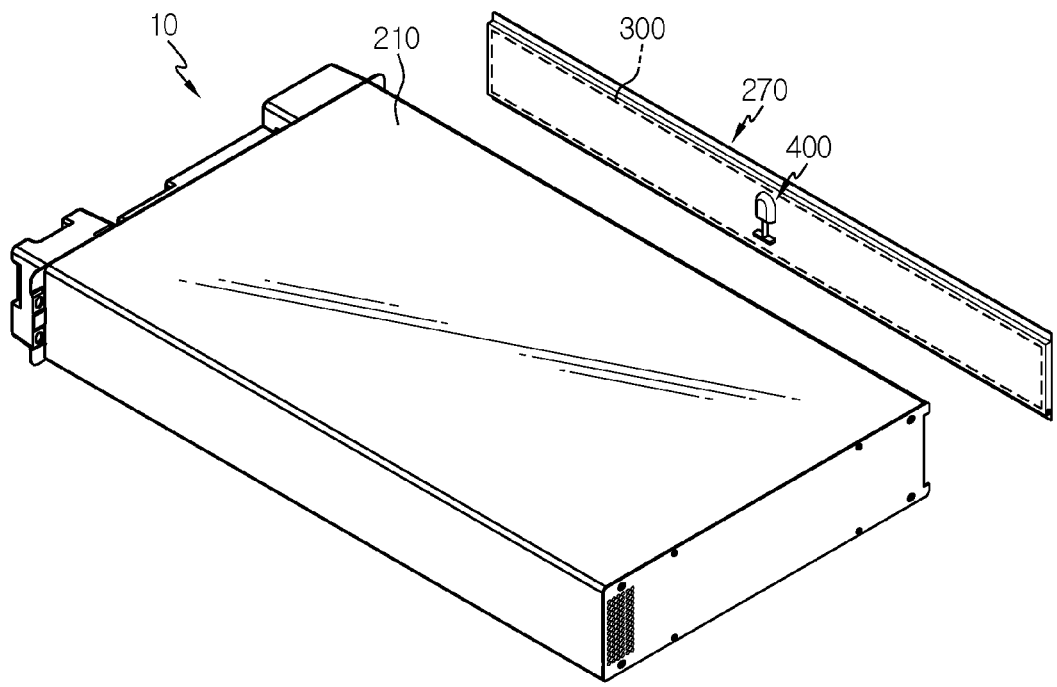
FIG. 4 is a partial exploded view showing the battery module of FIG. 2.
Figure 5:
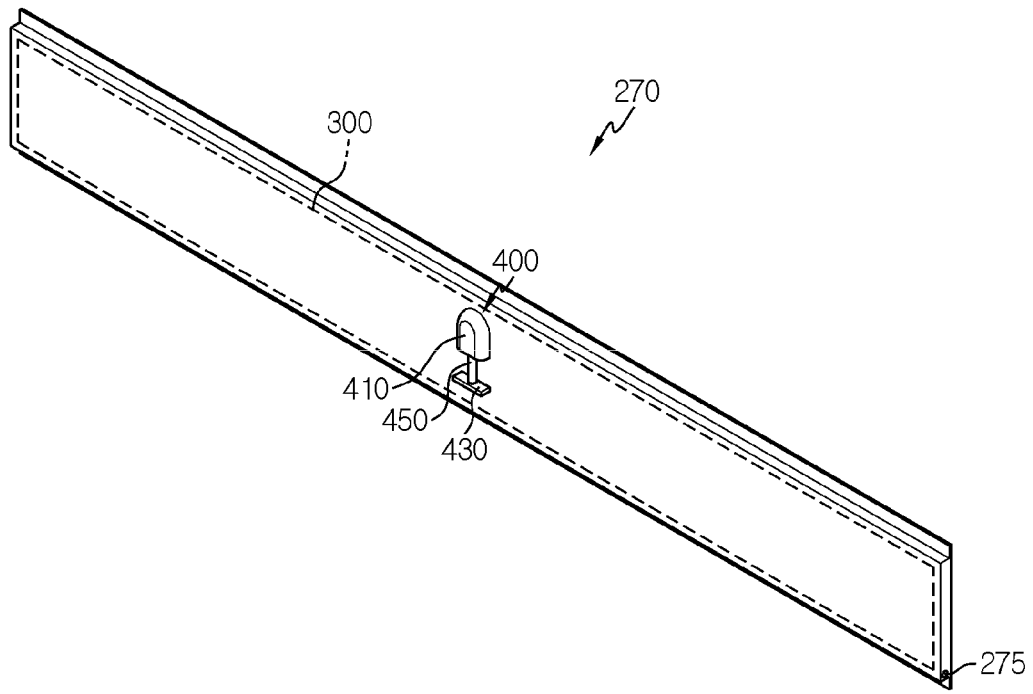
FIG. 5 is a perspective view showing a side plate, provided to the battery module of FIG. 4.
Figure 6:
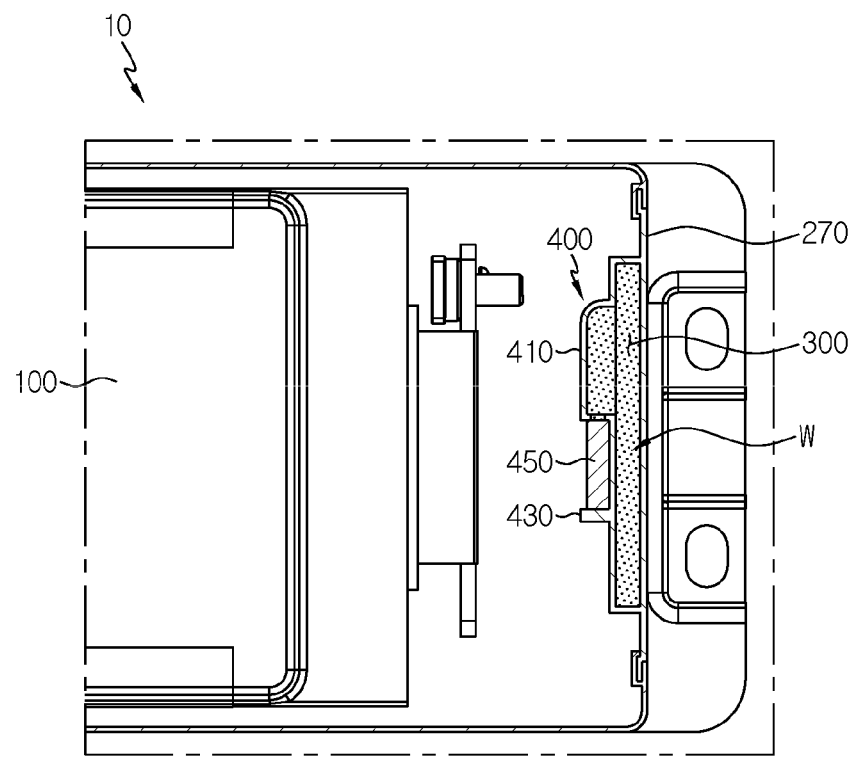
FIG. 6 is a sectional view showing a main part of the battery module of FIG. 1.
Figure 7:
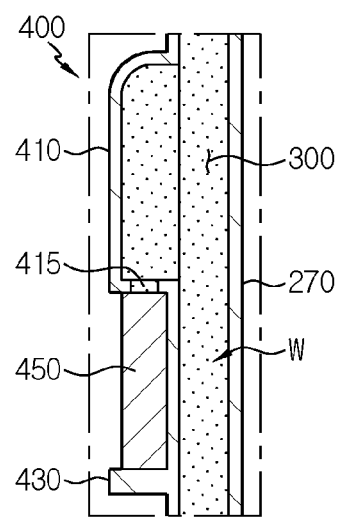
FIG. 7 is an enlarged view showing a main part of FIG. 6.

FIG. 1 is a front perspective view showing a battery module according to an embodiment of the present disclosure, FIG. 2 is a rear perspective view showing the battery module of FIG. 1, FIG. 3 is a partial exploded view showing the battery module of FIG. 1, FIG. 4 is a partial exploded view showing the battery module of FIG. 2, FIG. 5 is a perspective view showing a side plate, provided to the battery module of FIG. 4, FIG. 6 is a sectional view showing a main part of the battery module of FIG. 1, and FIG. 7 is an enlarged view showing a main part of FIG. 6.

Referring to FIGS. 1 and 6, a battery module 10 may include a battery cell 100 and a module case 200.

The battery cell 100 is a secondary battery, and may be provided as a pouch-type secondary battery, a rectangular secondary battery, or a cylindrical secondary battery. Hereinafter, in this embodiment, it will be described that the battery cell 100 is a pouch-type secondary battery.

At least one battery cell 100 or a plurality of battery cells 100 may be provided. Hereinafter, in this embodiment, it will be described that the battery cell 100 is provided in plural.

The module case 200 may accommodate the plurality of battery cells 100. To this end, an accommodation space for accommodating the plurality of battery cells 100 may be provided in the module case 200.

To an inside of at least one side of the module case 200, a fire extinguishing agent supply channel 300 connected to a fire extinguishing tank unit T (see FIG. 13) containing a fire extinguishing agent to directly inject the fire extinguishing agent into the module case 200 when a thermal runaway or a fire occurs at the at least one battery cell 100 may be provided. The fire extinguishing agent supply channel 300 will be described later in more detail than when the side plate 270 of the module case 200 is described.

The module case 200 may include a case body 210, a front cover 230, a rear cover 250, and a side plate 270.

The case body 210 may support the at least one battery cell 100, or a plurality of battery cells 100 in case of this embodiment. The case body 210 may also cover the plurality of battery cells 100.

The front cover 230 may be connected to the case body 210 and cover the front side of the case body 210. The front cover 230 may include a cooling air supply unit 235.

The cooling air supply unit 235 is disposed at the front side of the module case 200, and may supply a cooling air into the module case 200 of the battery module 10 in order to cool the battery cells 100.

The rear cover 250 is connected to the case body 210 at a side opposite to the front cover 230, and may cover the rear side of the case body 210. The rear cover 250 may include a cooling air discharge unit 255.

The cooling air discharge unit 255 may be disposed at the rear side of the module case 200, and may be disposed diagonally with the cooling air discharge unit 235. The cooling air discharge unit 255 may discharge the air, which has cooled the battery cells 100 inside the module case 200, to the outside of the module case 200.

The side plate 270 is disposed between the front cover 230 and the rear cover 250, and may be provided in a pair. The pair of side plates 270 may be connected to the case body 210, the front cover 230 and the rear cover 250 to package the plurality of battery cells 100.

At least one of the pair of side plates 270 may have the fire extinguishing agent supply channel 300. A connection hole 275 for connecting the fire extinguishing agent supply channel 300 and the fire extinguishing agent supply pipe 70 may be provided at the rear side of the side plate 270 to which the fire extinguishing agent supply channel 300 is provided.

The fire extinguishing agent supply channel 300 may be elongated along the longitudinal direction of the side plate 270, and may have a predetermined space inside the side plate 270 in which the fire extinguishing agent W may be filled. The fire extinguishing agent supply channel 300 may communicate with the fire extinguishing agent supply pipe 70 through the connection hole 275.

The side plate 270 to which the fire extinguishing agent supply channel 300 is provided may include a fire extinguishing agent injection unit 400.

The fire extinguishing agent injection unit 400 is for more effectively injecting the fire extinguishing agent W in the fire extinguishing agent supply channel 300 toward the at least one battery cell 100 when a thermal runaway or fire occurs, and may be provided to an inner wall of the side plate 270.

Specifically, the fire extinguishing agent injection unit 400 may be provided to the inner wall of the side plate 270 to which the fire extinguishing agent supply channel 300 facing the at least one battery cell 100 is provided, inside the module case 200.

More specifically, the fire extinguishing agent injection unit 400 may be provided at the center of the inner wall of the side plate 270 to which the fire extinguishing agent supply channel 300 is provided, based on the longitudinal direction of the module case 200.

The fire extinguishing agent injection unit 400 may include an injection unit body 410, a bulb support 430, and a glass bulb 450.

The injection unit body 410 may be provided at the center of the inner wall of the side plate 270 to communicate with the fire extinguishing agent supply channel 300. The injection unit body 410 may have an injection hole 415 for injection of the fire extinguishing agent.

The injection hole 415 is for injection of the fire extinguishing agent, and may communicate with the fire extinguishing agent supply channel 300. When the injection hole 415 is opened, the fire extinguishing agent may be injected to the outside.

The bulb support 430 may be provided at the center of the inner wall of the side plate 270 to be spaced apart from the injection unit body 410 by a predetermined distance. The bulb support 430 may support the glass bulb 450 together with the injection unit body 410 more stably.

The glass bulb 450 may be configured to seal the fire extinguishing agent supply channel 300. Also, the glass bulb 450 may be configured to be at least partially broken to open the fire extinguishing agent supply channel 300 when the inside of the module case 200 is exposed to an internal gas over a predetermined temperature, so that the fire extinguishing agent is guided to the outside of the fire extinguishing agent injection unit 400.

The glass bulb 450 is filled with a predetermined substance such as a predetermined liquid or gas. Such a predetermined material may have a property of increasing in volume as the temperature increases. Specifically, the glass bulb 450 may be broken, melted or separated from the injection unit body 410 due to volume expansion of the predetermined material at the predetermined temperature, for example 70° C. to 100° C. or above to open the injection hole 415.

Hereinafter, a fire extinguishing agent injection mechanism when an abnormal situation such as a fire situation of the battery module 10 according to this embodiment occurs will be described in detail.

Figure 8:
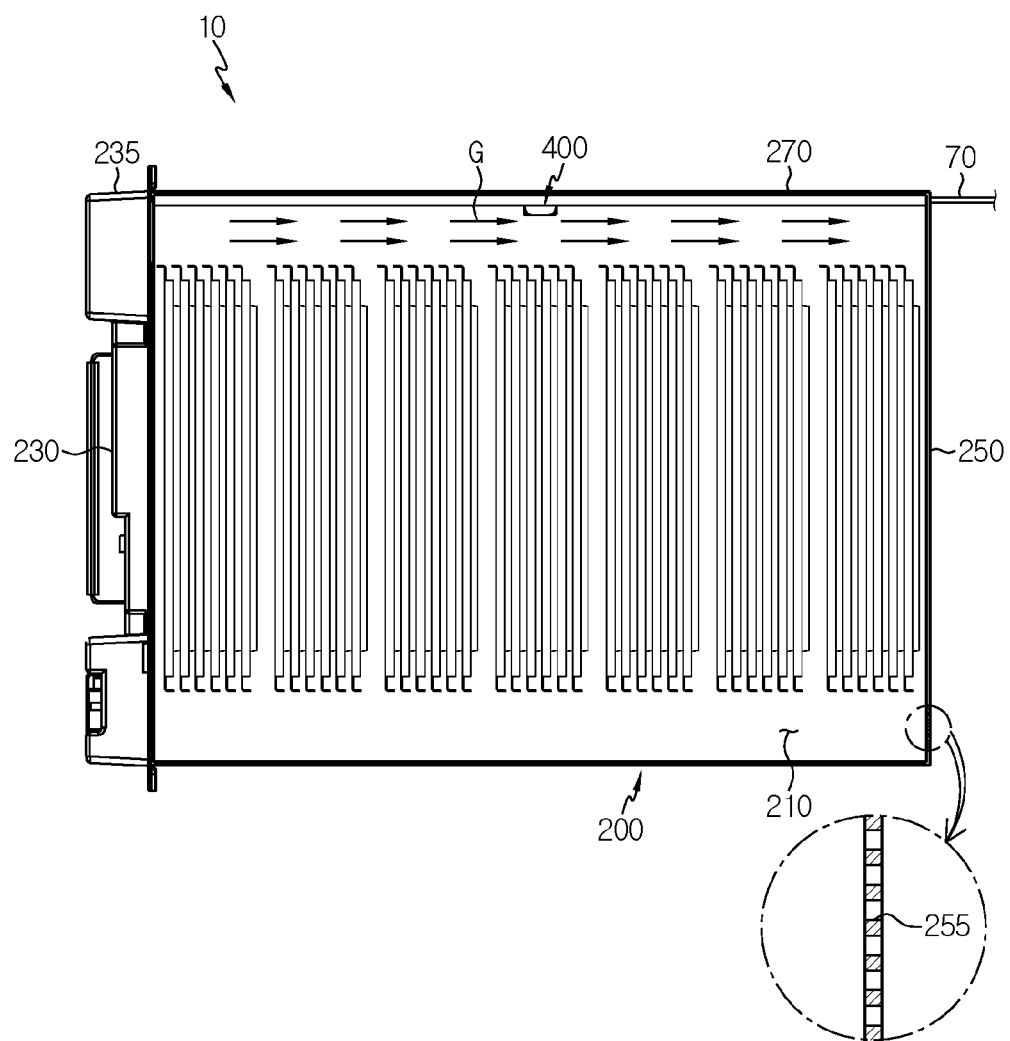
FIGS. 8 to 10 are diagrams for illustrating a fire extinguishing agent injection mechanism inside a module case when fire or thermal runaway occurs in the battery module of FIG. 1.
Figure 9:
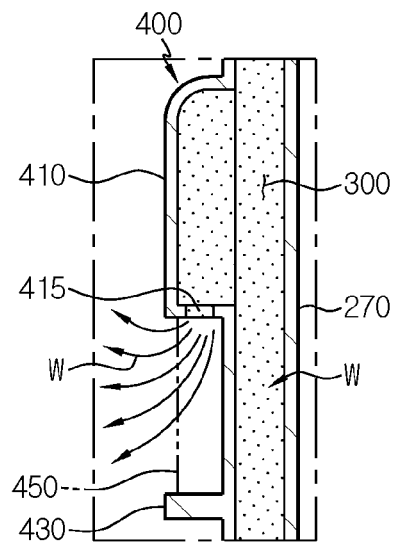
Figure 10:
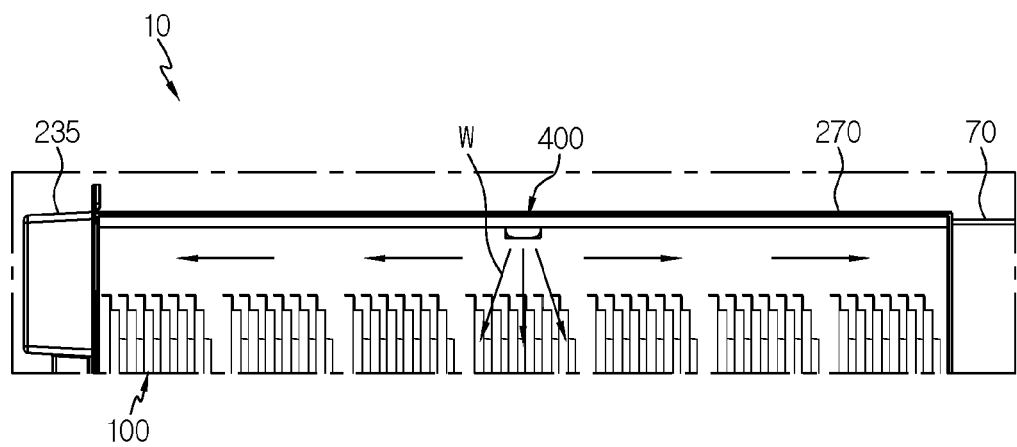

FIGS. 8 to 10 are diagrams for illustrating a fire extinguishing agent injection mechanism inside a module case when fire or thermal runaway occurs in the battery module of FIG. 1.

Referring to FIG. 8, in the battery cells 100 inside the module case 200 of the battery module 10, a fire situation or a thermal runaway situation caused by overheating may occur due to an abnormal situation in at least one battery cell 100. When such a fire situation or thermal runaway situation occurs, a high-temperature gas G may be generated inside the module case 200 due to the overheated battery cell 100.

Referring to FIGS. 9 and 10, the glass bulb 450 of the fire extinguishing agent injection unit 400 may be broken, melted or separated by the high-temperature gas G, so that the injection hole 415 for injecting the fire extinguishing agent W is opened.

As the injection hole 415 is opened, the fire extinguishing agent W, namely water W, in the fire extinguishing agent supply channel 300 may be immediately and directly injected toward the battery cells 100 through the injection hole 415.

Accordingly, in this embodiment, when a fire situation or a thermal runaway situation occurs at the battery module 10, since the fire extinguishing agent is immediately and directly injected toward the battery cells 100 inside the module case 200 by means of the fire extinguishing agent supply channel 300 and the fire extinguishing agent injection unit 400 provided to the side plate 270 of the module case 200, it is possible to more quickly and rapidly extinguish the fire or thermal runaway situation at an early stage.

Therefore, in this embodiment, by rapidly extinguishing the fire or thermal runaway situation at an early stage, it is possible to more effectively prevent a dangerous situation such as a secondary explosion from occurring due to the transfer of heat or flame to neighboring battery cells 100 in advance.

Figure 11:
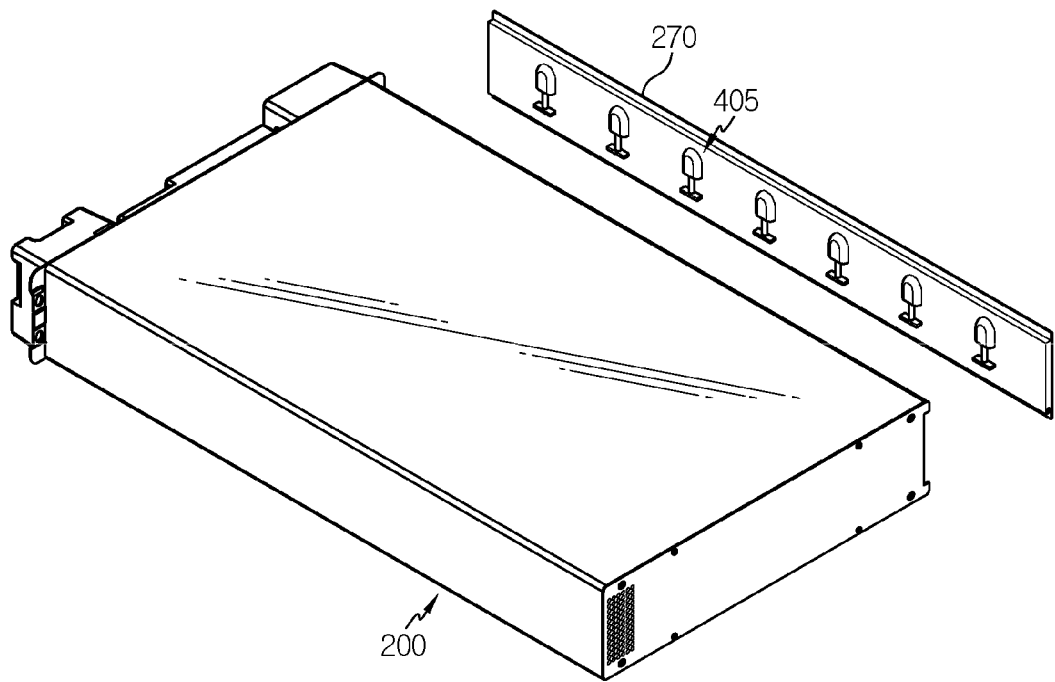
FIG. 11 is a diagram for illustrating a fire extinguishing agent injection unit according to another embodiment of the battery module of FIG. 4.

FIG. 11 is a diagram for illustrating a fire extinguishing agent injection unit according to another embodiment of the battery module of FIG. 4.

Referring to FIG. 11, the fire extinguishing agent injection unit 405 may be provided in plural. The plurality of fire extinguishing agent injection units 405 may be disposed to be spaced apart from each other by a predetermined distance along a longitudinal direction of the module case 200, specifically a longitudinal direction of the side plate 270.

In this embodiment, since the fire extinguishing agent injection unit 405 is provided in plural, when the thermal runaway or fire situation occurs, it is possible to extinguish such a fire more quickly.

Figure 12:
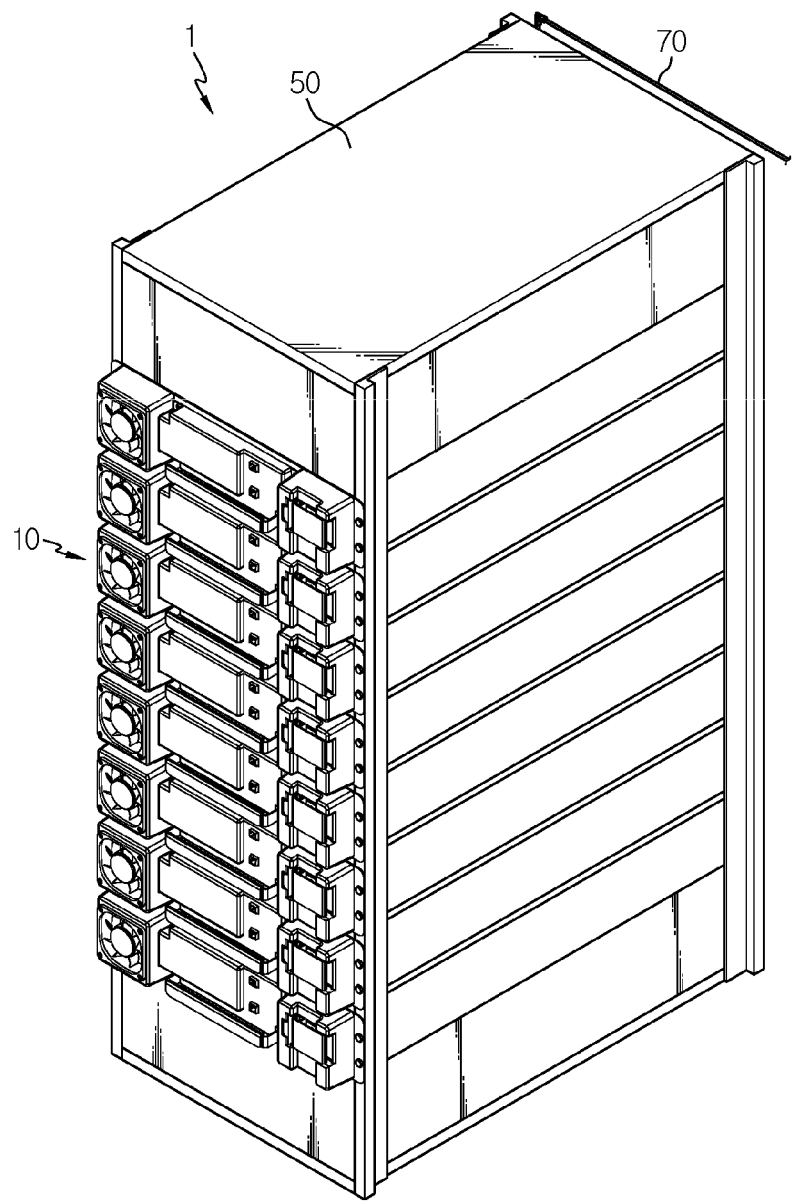
FIG. 12 is a diagram for illustrating a battery rack according to another embodiment of the present disclosure.

FIG. 12 is a diagram for illustrating a battery rack according to an embodiment of the present disclosure.

Referring to FIG. 12, a battery rack 1 may include the plurality of battery modules 10 of the former embodiment, a rack case 50 for accommodating the plurality of battery modules 10, and a fire extinguishing agent supply pipe 70 connected to the plurality of battery modules 10.

The fire extinguishing agent supply pipe 70 may communicate with the fire extinguishing unit 300 and the fire extinguishing tank unit T (see FIG. 13), explained later. Thus, when an abnormal situation such as a fire situation occurs in at least one of the plurality of battery modules 10, the fire extinguishing agent supply pipe 70 may guide the fire extinguishing agent of the fire extinguishing tank unit T to be supplied toward the battery module 10 where the abnormal situation occurs.

Since the battery rack 1 of this embodiment includes the battery module 10 of the former embodiment, the battery rack 1 may have all advantages of the battery module 10 of the former embodiment.

Figure 13:
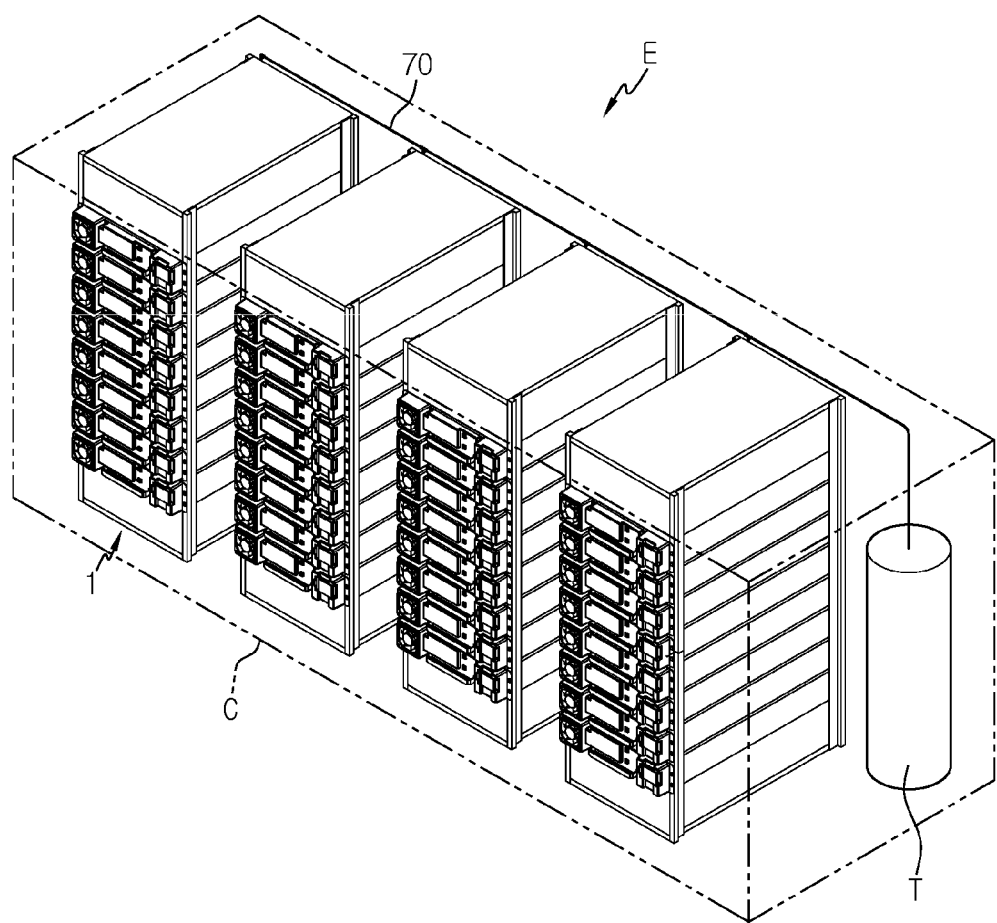
FIG. 13 is a diagram for illustrating an energy storage system according to an embodiment of the present disclosure.

FIG. 13 is a diagram for illustrating an energy storage system according to an embodiment of the present disclosure.

Referring to FIG. 13, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

The rack container C may include a fire extinguishing tank unit T for supplying a fire extinguishing agent to the plurality of battery racks 1. The fire extinguishing tank unit T is filled with the fire extinguishing agent, namely a fire extinguishing water prepared as water. The fire extinguishing tank unit T may be connected to the plurality of battery racks 1 through the fire extinguishing agent supply pipe 70 to supply the fire extinguishing water toward the plurality of battery racks 1.

Since the energy storage system E of this embodiment includes the battery rack 1 of the former embodiment, the energy storage system E may have all advantages of the battery rack 1 of the former embodiment.

According to various embodiments as above, it is possible to provide a battery module 10 capable of more rapidly extinguishing thermal runaway or fire at an early stage when thermal runaway occurs in the battery module 10 or fire occurs due to the thermal runaway or the like, a battery rack 1 including the battery module 10, and an energy storage system E including the battery rack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   at least one battery cell;
   a module case configured to accommodate the at least one battery cell, the module case having a front cover, a rear cover and a pair of side plates disposed between the front cover and the rear cover, at least one side plate of the pair of side plates having an inner wall and an outer wall spaced from the inner wall in a first direction;
   a fire extinguishing agent supply channel formed by the inner wall and outer wall of the at least one side plate, the fire extinguishing agent supply channel configured to be connected to a fire extinguishing tank containing a fire extinguishing agent to directly inject the fire extinguishing agent into the module case when a thermal runaway or fire occurs at the at least one battery cell provided to an inside of at least one side of the module case;
   a connection hole in fluid communication with the fire extinguishing agent supply channel on the outer wall of the at least one side plate; and
   at least one fire extinguishing agent injector in fluid communication with the fire extinguishing agent supply channel on the inner wall of the at least one side plate to directly inject the fire extinguishing agent into the module case, the at least one fire extinguishing agent injector spaced from the connection hole in a second direction,
   wherein the at least one fire extinguishing agent injector comprises an injector body extending inwardly into the module case from the inner wall, a support extending inwardly into the module case, and a stopper on the support and closing an injection hole in the injector body, and
   wherein the fire extinguishing agent supply channel has a predetermined space inside the at least one side plate, and the fire extinguishing agent fills the predetermined space prior to the thermal runaway or fire.

2. The battery module according to claim 1, wherein the stopper is a glass bulb, the glass bulb being at least partially broken to open the fire extinguishing agent supply channel when an inside of the module case is exposed to an internal gas over a predetermined temperature so that the fire extinguishing agent is guided to outside of the at least one fire extinguishing agent injector.

3. The battery module according to claim 1, wherein the at least one fire extinguishing agent injector is provided at a center of the inner wall of the at least one side plate to which the fire extinguishing agent supply channel is provided, based on a longitudinal direction of the module case.

4. The battery module according to claim 1, wherein the at least one fire extinguishing agent injector is a plurality of fire extinguishing agent injectors, and
   wherein the plurality of fire extinguishing agent injectors are arranged to be spaced apart from each other by a predetermined distance in a longitudinal direction of the module case.

5. The battery module according to claim 1, wherein the fire extinguishing agent is water.

6. A battery rack, comprising:
   at least one battery module as defined in claim 1; and
   a rack case configured to accommodate the at least one battery module.

7. An energy storage system, comprising:
   at least one battery rack as defined in claim 6.

8. The battery module according to claim 1, wherein the stopper is a glass bulb.

9. The battery module according to claim 1, wherein the at least one fire extinguishing agent injector is a plurality of fire extinguishing agent injectors.

10. The battery module according to claim 1, wherein the fire extinguishing agent supply channel is in a center of the at least one side plate, and
    wherein the connection hole is in a corner of the at least one side plate.

11. The battery module according to claim 1, wherein the fire extinguishing agent supply channel extends from a first side edge to a second side edge of the at least one side plate.

* * * * *